United States Patent [19]

Cooper et al.

[11] 4,087,905
[45] May 9, 1978

[54] METHOD OF PREPARING A POWDERED, ELECTRICALLY INSULATIVE SEPARATOR FOR USE IN AN ELECTROCHEMICAL CELL

[75] Inventors: Tom O. Cooper; William E. Miller, both of Naperville, Ill.

[73] Assignee: The United States of America as represented by the United States Department of Energy, Washington, D.C.

[21] Appl. No.: 782,874

[22] Filed: Mar. 30, 1977

[51] Int. Cl.² ........................................... H01M 10/28
[52] U.S. Cl. .................................. 29/623.1; 429/133; 429/139
[58] Field of Search ................... 29/623.1, 623.5, 420; 429/131, 132, 133, 137, 139

[56] References Cited

U.S. PATENT DOCUMENTS

| 1,644,344 | 10/1927 | Martus et al. | 29/623.1 |
| 2,176,173 | 10/1939 | Fuller et al. | 429/132 |
| 2,247,992 | 7/1941 | DeMartis et al. | 429/139 |

FOREIGN PATENT DOCUMENTS

| 149,919 | 2/1953 | Australia | 429/139 |

Primary Examiner—Lowell A. Larson
Attorney, Agent, or Firm—Dean E. Carlson; Frank H. Jackson; Hugh W. Glenn

[57] ABSTRACT

A secondary electrochemical cell includes electrodes separated by a layer of electrically insulative powder. The powder includes refractory materials selected from the oxides and nitrides of metals and metaloids. The powdered refractory material, blended with electrolyte particles, is compacted as layers onto an electrode to form an integral electrode structure and assembled into the cell. The assembled cell is heated to its operating temperature leaving porous layers of electrically insulative, refractory particles, containing molten electrolyte between the electrodes.

7 Claims, 2 Drawing Figures

METHOD OF PREPARING A POWDERED, ELECTRICALLY INSULATIVE SEPARATOR FOR USE IN AN ELECTROCHEMICAL CELL

CONTRACTUAL ORIGIN OF THE INVENTION

The invention described herein was made in the course of, or under, a contract with the U.S. Energy Research And Development Administration.

BACKGROUND OF THE INVENTION

This invention relates to interelectrode separators for secondary electrochemical cells. Batteries of such electrochemical cells are contemplated for use as power sources for electric automobiles, storage of electric energy generated during intervals of off-peak power consumption and various other applications. The separator of this development is particularly applicable to electrochemical cells that operate at high temperatures and therefore require the use of high temperature insulators and materials.

A substantial amount of work has been done in the development of these types of electrochemical cells and their electrodes. Examples of such high temperature cells and their various components are disclosed in U.S. Pat. Nos. 3,915,742 to Battles and Mrazek entitled "Interelectrode Separator for Electrochemical Cell", Oct. 28, 1975; 3,947,291 to Yao and Walsh entitled "Electrochemical Cell Assembled in Discharge State", Mar. 30, 1976; U.S. Pat. No. 4,011,374 to Kaun entitled "Porous Carbonaceous Electrode Structure and Method for Secondary Electrochemical Cell", and copending patent application Ser. No. 771,131 to Mathers et al. entitled "Powdered Electrically Insulative Material as a Separator in an Electrochemical Cell," filed Feb. 23, 1977, and identified as U.S. ERDA Case No. S-47,593.

Previous electrochemical cells which operate at high temperatures, e.g. 300°-600° C, have required the use of suitable high temperature materials. Refractory, electrically insulative materials such as boron nitride, and yttrium oxide have been fabricated into cloth, netting, felt, paper, other fabrics, etc., in attempts to provide suitable interelectrode separators. Although these efforts have been successful to some extent, they involve difficult and expensive fabrication, processes and sometimes provide separator components, that are not sufficiently tough and durable. Also, other oxides and nitrides of metals and metaloids such s magnesium oxide, calcium oxide, silicon nitride and aluminum nitride are unavailable or are difficult to provide in a fibrous form that can be fabricated readily into integral separator components.

Therefore, in view of these disadvantages of prior art separator materials, it is an object of the present invention to provide an improved method of preparing an interelectrode separator for an electrochemical cell.

It is a further object to provide a method of preparing an interelectrode separator during electrode preparation.

It is also an object to provide a method of preparing an interelectrode separator for an electrochemical cell that can employ readily available forms of refractory, electrically insulative material.

SUMMARY OF THE INVENTION

In accordance with the present invention there is provided a method of preparing an electrode structure including layers of refractory electrically insulative particles at the upper, lower and edge surfaces.

A pressed compact of electrode reactant and electrolyte particles is first formed. A layer of refractory, electrically insulative powder blended with an electrolyte as binder is distributed within a die and the previously pressed compact of electrode reactant centrally placed within the die on the layer of powder. Then the annular volume between the die walls and the electrode compact is filled and the upper surface of the electrode compact is covered with additional amounts of the blended, refractory material and salt powder. The upper and lower layers of powdered material are then pressed into the electrode compact surface to form an integral electrode structure with a compacted layer of refractory, electrically insulative material at all outer surfaces. On subsequent assembly within an electrochemical cell with electrodes of opposite polarity facing opposite surfaces of the electrode structure, the cell is raised to its operating temperature at which the electrolytic salt becomes molten leaving a porous separator of discrete particles of refractory, electrically insulative material enclosing the compact of electrode reactive material.

BRIEF DESCRIPTION OF THE DRAWINGS

The present invention is illustrated in the accompanying drawings wherein.

DETAILED DESCRIPTION OF THE PREFERRED EMBODIMENT

Figure 1:
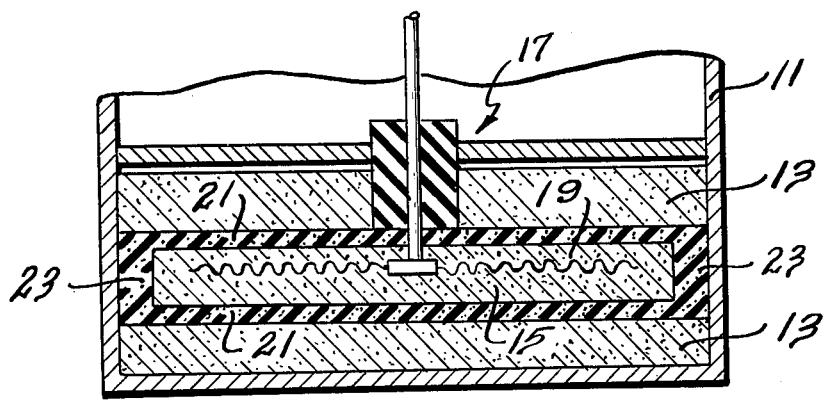
FIG. 1 is a cross sectional view of a secondary electrochemical cell.

In FIG. 1 an electrochemical cell is shown contained in an outer housing 11. The cell is illustrated with two negative electrodes 13 on either side of a positive electrode 15. An insulative feedthrough assembly 17 extends from the positive electrode, current collector 19 to outside the cell for electrical connection. The negative electrodes 13 are in electrical contact with the housing 11. The positive electrode 15 is separated from the two negative electrodes and the cell housing by upper and lower layers 21 of refractory, electrically insulative powders. During operation of the cell, these electrically insulative layers comprise discrete particles of the refractory material with sufficient porosity within the layers for permeation of molten electrolyte and ionic conduction between the electrodes.

The positive electrode, illustrated as the center electrode in FIG. 1, can be prepared in much the same manner as that described in allowed U.S. Pat. application, Ser. No. 665,746, entitled "Improved Method of Preparing an Electrochemical Cell in Uncharged State" to Shimotake et al., filed Mar. 11, 1976. According to that method, particulate electrode material, for example, the sulfides of iron, cobalt, nickel, or copper, along with particulate electrically conductive material as current collector and powdered electrolyte can be blended together and pressed into an electrode compact. Current collector 19 and the attached conductor can be positioned between powdered layers of electrode material prior to pressing. The pressing can be carried out at ambient temperatures to merely compact the powders together or the temperature can be elevated during pressing to melt the electrolyte such that is diffuses throughout the electrode compact.

The negative electrodes 13 can be provided in a number of forms by a number of methods. They can be compacts of pressed wires, fibers, particles of the electrode active material either in the charged or discharged state. For instance, a compact of pressed aluminum wires can be electroprocessed to lithium-aluminum alloy as negative electrode material either within the cell or in a preparatory step. In the present development, fine mesh screens can be placed over such electrodes if their pore openings are sufficiently large to admit particles from the separator layer. In other instances, the negative electrodes might be prepared by compacting the active material with electrolyte in the same manner as the positive electrode. Various other techniques that are described and illustrated in the above cited patents also can be employed in providing the negative electrodes.

The electrolyte used can be of various ion containing materials, but for high temperature electrochemical cells electrolytic salt compositions that are molten at cell operating temperatures are employed. Temperatures in the range of 300°–600° C. are contemplated. Electrolytic salt compositions of LiCl—KCl or LiCl—LiF—KBr along with various other suitable electrolytes such as those listed in U.S. Pat. No. 3,488,221 have been found to be suitable.

Separator layers 21 include powders of refractory, electrically insulative material such as boron nitride, magnesium oxide, calcium oxide, yttrium oxide, lithium aluminate, aluminum nitride, silicon nitride, or mixtures of these materials. Various other refractory, electrically insulative materials may also be suitable. These materials in powdered layers provide a porous, electrically insulative, interelectrode separator between electrodes of opposite polarity. Molten electrolyte within the void volume of the layers provides ionic conduction between the electrodes during charge and discharge of the cell. The annular volumes 23 between the edge surfaces of the central electrode 15 and the cell housing 11 are also filled with the powdered, electrically insulative material as the outer electrodes 13 are in electrical contact with the housing.

Figure 2:
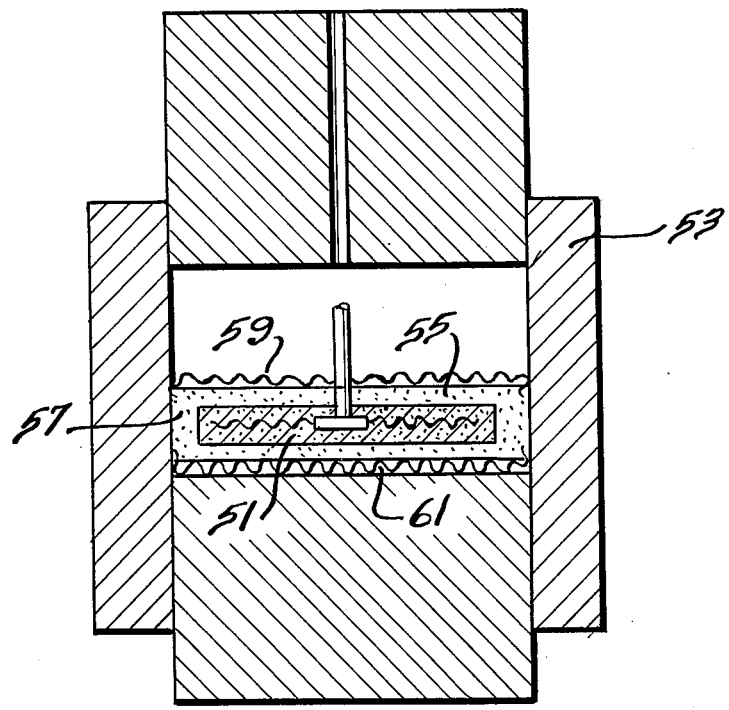
FIG. 2 is a cross sectional view of a die containing a compacted electrode and powdered layers for forming an integral electrode and separator structure.

FIG. 2 illustrates a preferred method of preparing the powdered, electrode separator layers as part of an integral electrode structure. In this method electrode 51 containing electrolyte, electrode active material and current collector is prepared as a pressed compact in a preliminary pressing step. Powdered separator material 55 is then pressed into the surfaces of the previously prepared electrode compact 51 in a second pressing step. In accomplishing this a lower layer of the refractory, electrically insulative powder mixed with electrolyte powder is distributed within die 53. The mixture will typically include about 30–50 volume percent electrolyte based on the densities of the solids at 25° C. Electrode compact 51 is centrally positioned on the layer of refractory powder. Then the upper surface and the annular volume 57 around the edge surfaces of compact 51 are covered and filled with the mixture of refractory material and electrolyte. An additional amount of powder can be distributed over annular volume 57 to compensate for the previous compaction of the electrode material. The powdered layers can then be pressed into the surfaces and edges of the electrode compact.

In some instances fine mesh screens 59 and 61 of smaller aperture than the particle sizes of a major portion of the refractory powder, e.g. screens of 325 U.S. sieve series, are placed above and below the layers of refractory powder. The screens are especially advantageous where adjacent electrodes have openings or pores larger than the refractory particles or where the enclosed electrode 51 is expected to swell during cycling and displace the refractory separator layers. The screens 59 and 61 are illustrated as cup-shaped to enhance particle retention.

The arrangement of the powdered mixture 55 surrounding the electrode compact 51 can be pressed at about 70–80 MPa (about 10,000 to 12,000 psi) and at ambient temperatures into an integral electrode structure including screens 59 and 60. The refractory particles are embedded by pressure into both the upper, lower and edge surfaces of the electrode compact. An integral electrode structure is thus produced of the same outside diameter as the cell housing.

An electrode structure as produced by the above described method is illustrated in FIG. 1 as the center electrode 15 and the compacted refractory powder 21. It is assembled within the cell without having to subsequently fill the annular volume between the electrode and the cell housing with the electrically insulative material. In addition, such as integral structure ensures that a complete layer of electrically insulative material is disposed between the edge surfaces of the central electrode and the cell housing. On heating the assembled cell to its operating temperature the electrolyte melts leaving porous layers of refractory, electrically insulative particles, permeated with molten electrolyte surrounding the central electrode.

The refractory particles employed in the electrode separators are of a generally equiaxed shape with equal dimensions in all direction. They need not be all of the same particle sizes. Through use of differing particle sizes advantages in compaction and reduced loss of particles can be obtained. It has been found that one advantageous particle size distribution will include particles of about 150–250 micrometers for about 70% of the refractory material weight and particles of 1–10 micrometers for the remaining 30% of the refractory material weight.

A sufficient thickness of the powdered electrode separator material is required to adequately insulate the electrodes from one another and the central or the ungrounded electrode from the cell housing. In order to do this without adding unduly to the cell weight, layers of about 2 to 4 mm thick have been incorporated into electrodes of about 10 cm diameter.

It will be understood that although the electrochemical cell of FIG. 1 and the described methods involve three electrodes and two layers of electrode separators, the invention is also applicable to other electrochemical cells having two or any other reasonable number of electrodes arranged in a stack or series. Either positive electrodes, as described and illustrated, or negative electrodes can be formed as integral structures with the separator layers. Various other cells and electrode designs, as illustrated in the above-cited patents, can also be arranged with the powdered separator design and the methods described herein.

The following example is presented to further illustrate the present invention.

EXAMPLE

A number of previously pressed elctrodes containing particulate $Li_2S$ and Fe as active material were assembled individually within a die and surrounded by a mixture of refractory material and LiCl — KCl electrolyte much in the manner illustrated in FIG. 2. The materials were pressed at about 70 MPa to form electrode structures including separator layers. The electrode structures were assembled as positive electrodes within electrochemical cells and tested. The results of the test are given below in Table I.

TABLE I

| Material | Ideal Mix* Vol % | Cell Test Results |
|---|---|---|
| $Y_2O_3$ | 33.0 $Y_2O_3$ | Voluntarily terminated after 160 cycles, 900 Hrs. |
|  | 33.0 Salt | 900 Hrs. operated between |
|  | 34.0 Void | 50–200 $mA/cm^2$ w/o much change in utilization. |
| MgO Mixed crystal | 38.3 MgO 45.6 Salt 16.1 Void | The cell shorted after 2 cycles. |
| BN | 44.0 BN 43.0 Salt 13.0 Void | BN powder did not seem to be wetted by salt - 10% utilization - terminated test. |
| BN & $Y_2O_3$ | 21.4 BN 21.4 $Y_2O_3$ 28.5 Salt 28.7 Void | After 20 cycles and 100 hr achieved 50% utilization at 40, 50, and 75 $mA/cm^2$. |

*Based on densities at 25° C.

It can be seen from the above that the present invention provides a new method and separator concept for high-temperature, high-power secondary electrochemical cells. The development provides a method for employing such refractory materials as calcium oxide, magnesium oxide, silicon nitride and aluminum nitride which are ordinarily only available in powdered form. The formation of integral electrode-separator structures facilitates cell assembly and ensures adequate thickness of the separator layers on both major and edge surfaces of the electrode.

The embodiments of the invention in which an exclusive property or privilege is claimed are as follows:

1. A method of preparing an electrode structure for use in a secondary, electrochemical cell comprising disposing a layer of a particulate mixture of powdered, refractory, electrically insulative material blended with a binder of powdered, electrolytic salt selected from alkali metal halides, alkaline earth metal halides, and mixtures thereof within a die suitable for pressing powders; centrally placing an electrode compact onto said particulate mixture layer within said die to define an annular volume around said electrode compact within the die walls; filling said annular volume and covering the upper surface of said electrode compact with additional amounts of said particulate mixture including powdered, refractory, electrically insulative material; and pressing said layers and electrode compact and particulate mixture to form an integral structure having a compacted layer including refractory, electrically insulative particles at all outer surfaces.

2. The method of claim 1 wherein said integral electrode structure is assembled within an electrochemical cell with electrodes of opposite polarity facing opposite surfaces of said electrode structure enclosed within said layers of electrolytic salt and refractory, electrically insulative material; and said electrochemical cell is heated to a temperature at which said electrolytic salt becomes molten leaving a porous separator of discrete particles of refractory, electrically insulative material enclosing said electrode compact.

3. The method of claim 1 wherein said refractory, electrically insulative material is boron nitride, magnesium oxide, calcium oxide, yttria, lithium aluminate, silicon nitride, aluminum nitride or mixtures thereof.

4. The method of claim 1 wherein said layers and electrode compact are pressed at about 70–80 MPa.

5. The method of claim 1 wherein said particulate mixture includes about 30 to 50 volume percent electrolyte.

6. The method of claim 1 wherein screens having apertures smaller than the particle size in a major fraction of the refractory material powder are disposed above and below the upper and lower layers of refractory, electrically insulative material prior to pressing to incorporate said screens into said integral electrode structure.

7. The method of claim 6 wherein said major fraction of refractory particles are of about 150–250 micrometers particle size and said screens are about 325 U.S. sieve series mesh.

* * * * *